United States Patent
Abdool et al.

(12)

(10) Patent No.: US 8,506,099 B1
(45) Date of Patent: Aug. 13, 2013

(54) PORTABLE, ADJUSTABLE MIRROR STAND

(76) Inventors: Jacklyn Abdool, Indianapolis, IN (US);
Denise Abdool, Indianapolis, IN (US)

( * ) Notice: Subject to any disclaimer, the term of this patent is extended or adjusted under 35 U.S.C. 154(b) by 444 days.

(21) Appl. No.: 12/856,710

(22) Filed: Aug. 16, 2010

(51) Int. Cl.
*G02B 7/182* (2006.01)

(52) U.S. Cl.
USPC ........... 359/872; 359/875; 359/881; 248/469; 248/474; 248/481; 248/482

(58) Field of Classification Search
USPC ................. 359/872, 875, 879, 881; 248/469, 248/473, 474, 479, 481, 483, 482
See application file for complete search history.

(56) References Cited

U.S. PATENT DOCUMENTS

| | | | |
|---|---|---|---|
| 695,951 A | 5/1902 | Seymoure | |
| 898,263 A | 9/1908 | Rice | |
| 1,220,069 A * | 3/1917 | Capdevila | 248/474 |
| 1,489,934 A * | 4/1924 | Eklund | 359/862 |
| 2,017,472 A * | 10/1935 | Re | 248/474 |
| 2,223,361 A * | 12/1940 | Favre | 351/203 |
| 2,915,944 A * | 12/1959 | Butts | 248/480 |
| 3,104,830 A * | 9/1963 | Rock | 362/144 |
| 3,781,093 A | 12/1973 | Grabijas | |
| 3,792,917 A | 2/1974 | Martinez | |
| 4,339,104 A * | 7/1982 | Weidman | 248/407 |
| 4,750,811 A * | 6/1988 | Beyer | 359/602 |
| 4,856,888 A | 8/1989 | Wahl | |
| D309,833 S | 8/1990 | Wahl | |
| 5,106,177 A * | 4/1992 | Dolasia | 359/876 |
| 5,737,847 A | 4/1998 | Britton | |
| 6,076,847 A * | 6/2000 | Thornton | 280/477 |
| 6,213,608 B1 * | 4/2001 | Osgood | 359/841 |
| 6,382,802 B1 * | 5/2002 | Goodman | 359/840 |
| 8,157,394 B1 * | 4/2012 | Downing | 359/868 |
| 2005/0167563 A1 | 8/2005 | Delaney | |

* cited by examiner

*Primary Examiner* — Ricky D Shafer
(74) *Attorney, Agent, or Firm* — Montgomery Patent & Design; Robert C. Montgomery

(57) ABSTRACT

A freestanding portable holding apparatus for a handheld mirror comprises a base which ensures stability and a center-mounted pole extending upward from the base having a height adjustment mechanism that allows the pole to be extended upwards or downwards as desired by the user. An upper end of the apparatus is provided with an adjustable clip to hold a variety of handheld mirrors in an inverted fashion. It is adjustable in height so that a user can see the rear of their head while looking in another stationary mirror. This feature affords the user the use of both hands while styling hair without having to constantly switch and move the handheld mirror in one hand.

14 Claims, 5 Drawing Sheets

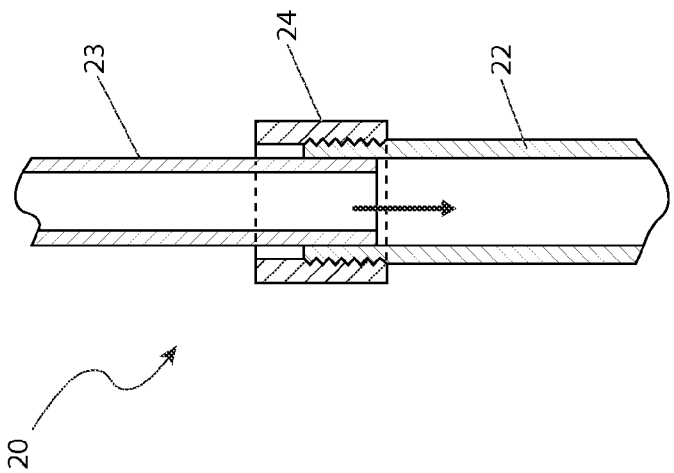
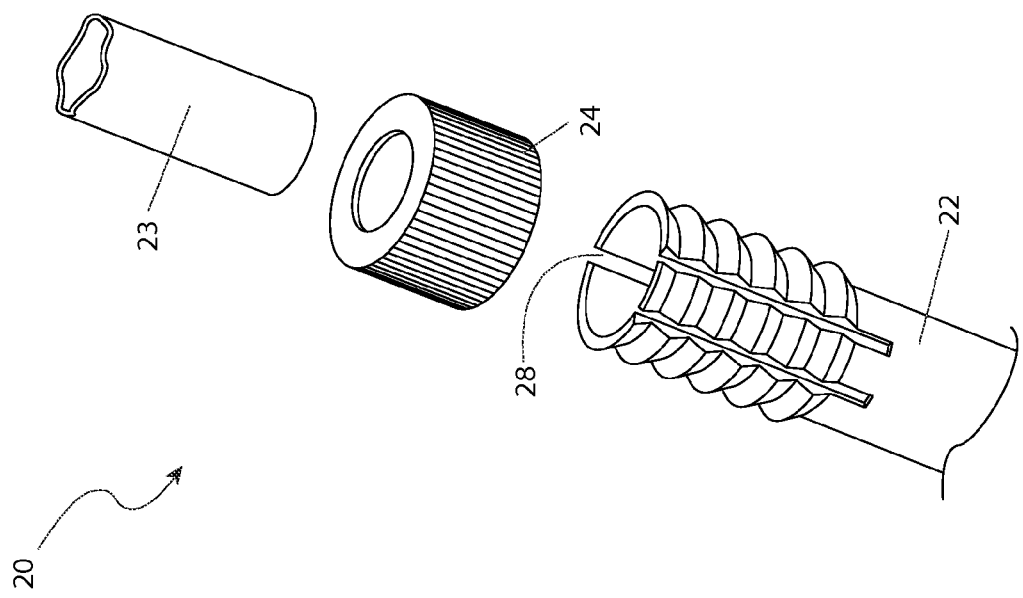

PORTABLE, ADJUSTABLE MIRROR STAND

RELATED APPLICATIONS

The present invention was first described in a notarized Official Record of Invention on Jul. 9, 2009, that is on file at the offices of Montgomery Patent and Design, LLC, the entire disclosures of which are incorporated herein by reference.

FIELD OF THE INVENTION

The present invention relates generally to adjustable support devices, and in particular, to a portable, adjustable stand for retaining a handheld mirror at a desired vertical position.

BACKGROUND OF THE INVENTION

Many people utilize a handheld mirror in conjunction with a fixed wall-mounted mirror in order to see the rear of their head. Such vision is important to ensure beautiful hair styling all around and not just in the front. However, the usage of a handheld mirror requires that the user hold the mirror with one of their hands. Obviously, this only leaves one (1) hand for use with hair brushes, picks, curling irons, hair dryers and the like, thus forcing the user to constantly swap items, move the mirror from one (1) to another and so forth. This adds to the amount of time that hair styling takes and can negatively affect the outcome.

Additionally, many people prefer make-up mirrors when applying make-up. Typically these mirrors are hand held or include a small base support so the mirror can rest upon a dresser, chest, or counter top. However, these positions are usually inconvenient and uncomfortable for the user requiring them to bend or stoop in order to look into the mirror properly.

One (1) solution to these problems is to simply mount a mirror on a wall at a desired height or opposite another mirror. This solution requires mounting hardware and restricts the position of the mirror to a small range of users having a similar height as the original installer. Various other stands and supports also attempt to provide solutions to these problems. Typically, these types of devices provide a support stand with some way to adjust a mirrored surface. Examples of such attempts can be seen by reference in several U.S. Patents, including U.S. Pat. Nos. 695,951, issued in the name of Seymoure; 898,263, issued in the name of Rice; 3,781,093, issued in the name of Grabijas; 3,792,917, issued in the name of Martinez; 4,856,888, issued in the name of Wahl; and D 309,833, issued in the name of Wahl.

While these devices may accomplish their specific intended purpose, each suffers from one (1) or more disadvantage or deficiency with respect to design, function, or effectiveness. In particular, the previous solutions typically lack the ability to cover a wide range of adjustable heights. Additionally, they limit the range or the axis upon which the mirror can be angularly positioned. Many such devices restrict the ability to remove the mirror for it to be used for other purposes. Accordingly, there exists a need for a means by which the vision of a handheld mirror can be provided without the necessity of constantly holding it. The development of the present invention substantially departs from the conventional solutions and in doing so fulfills this need.

SUMMARY OF THE INVENTION

In view of the foregoing references, the inventor recognized the aforementioned inherent problems and lack in the art and observed that there is a need for a portable support apparatus designed to hold a handheld mirror such that both hands of the user are free for use. Thus, the object of the present invention is to solve the aforementioned disadvantages and provide for this need.

Another object of the present invention is to provide an apparatus which allows for adjustable positioning of the mirror over a wide range of vertical positions.

Yet another object of the present invention is to provide an apparatus which allows for adjustable positioning of the mirror over a wide range of angular positions.

Yet another object of the present invention is to provide an apparatus which can be used with various types, designs, and sizes of handheld mirrors.

Yet still another object of the present invention is to provide an apparatus which is simple and intuitive to use with little to no training.

Yet still another object of the present invention is to provide an apparatus which is durable and economical to manufacture.

One (1) or more of these and other objects of the invention are achieved by providing an adjustable stand for a handheld mirror. The stand comprises a circular base having a planar top and bottom side and a mass for contact and stabilization with a flat support surface. An elongated cylindrical outer pole having an end affixed to a center of the base is telescopically connected to an elongated cylindrical inner pole having an end insertingly attached to outer pole. The outer pole further comprises a diameter suitably sized to slidingly receive the inner pole and the inner pole may be extended or retracted with respect to the outer pole. A collar is provided for adjustably securing the telescopically connected inner pole at a desired vertical position. A ball and socket joint for providing an adjustable angular position is affixed to a spring clip for removably retaining the handheld mirror.

Furthermore, the described features and advantages of the invention may be combined in various manners and embodiments as one skilled in the relevant art will recognize. The invention can be practiced without one (1) or more of the features and advantages described in a particular embodiment.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5 is an exploded view of a split shaft collar portion of the portable adjustable mirror stand 10, according to a preferred embodiment of the present invention; and, FIG. 6 is a sectional view of the split shaft collar portion of the portable adjustable mirror stand 10, according to a preferred embodiment of the present invention.

DESCRIPTIVE KEY

Figure 1:
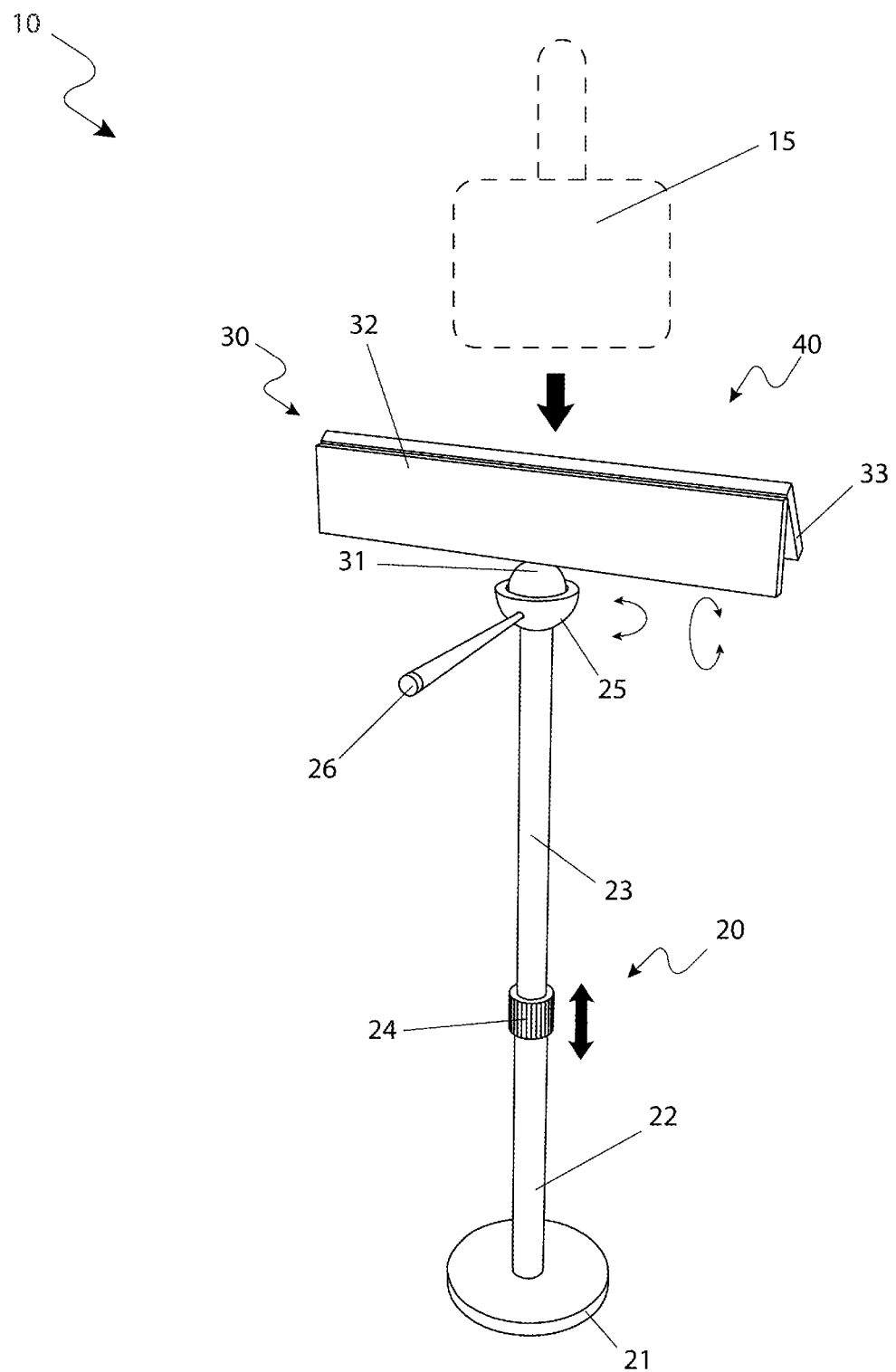
FIG. 1 is a perspective front view of a portable adjustable mirror stand 10, according to a preferred embodiment of the present invention.

| | |
|---|---|
| 10 | portable adjustable mirror stand |
| 15 | mirror |
| 20 | lower portion |
| 21 | base |
| 22 | outer pole |
| 23 | inner pole |
| 24 | collar |
| 25 | socket |
| 26 | handle |
| 27 | aperture |
| 28 | split portion |
| 30 | upper portion |
| 31 | ball |
| 32 | first jaw |
| 33 | second jaw |
| 34 | padded surface |
| 35 | spring steel |
| 36 | rivet |
| 40 | clip |

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a portable adjustable mirror stand (herein described as the "apparatus") 10, comprising an adjustable freestanding mirror holder which allows each hand of a user to be free and utilized during hairstyling, putting on makeup, or similar activity. The apparatus 10 is preferably utilized with conventional hand-held mirrors 15 generally comprising at least a reflective surface and a handle. The apparatus 10 comprises a lower portion 20 and an upper portion 30; the upper portion 30 enables a mirror 15 to be secured in a desired angle and a desired height which allows the user to utilize the mirror 15 in a conventional manner. The apparatus 10 is fabricated from materials such as, but not limited to: metal, plastic, or the like. The apparatus 10 is preferably utilized for hairstyling, yet other methods of use may be utilized without limiting the scope of the apparatus 10.

Figure 2:
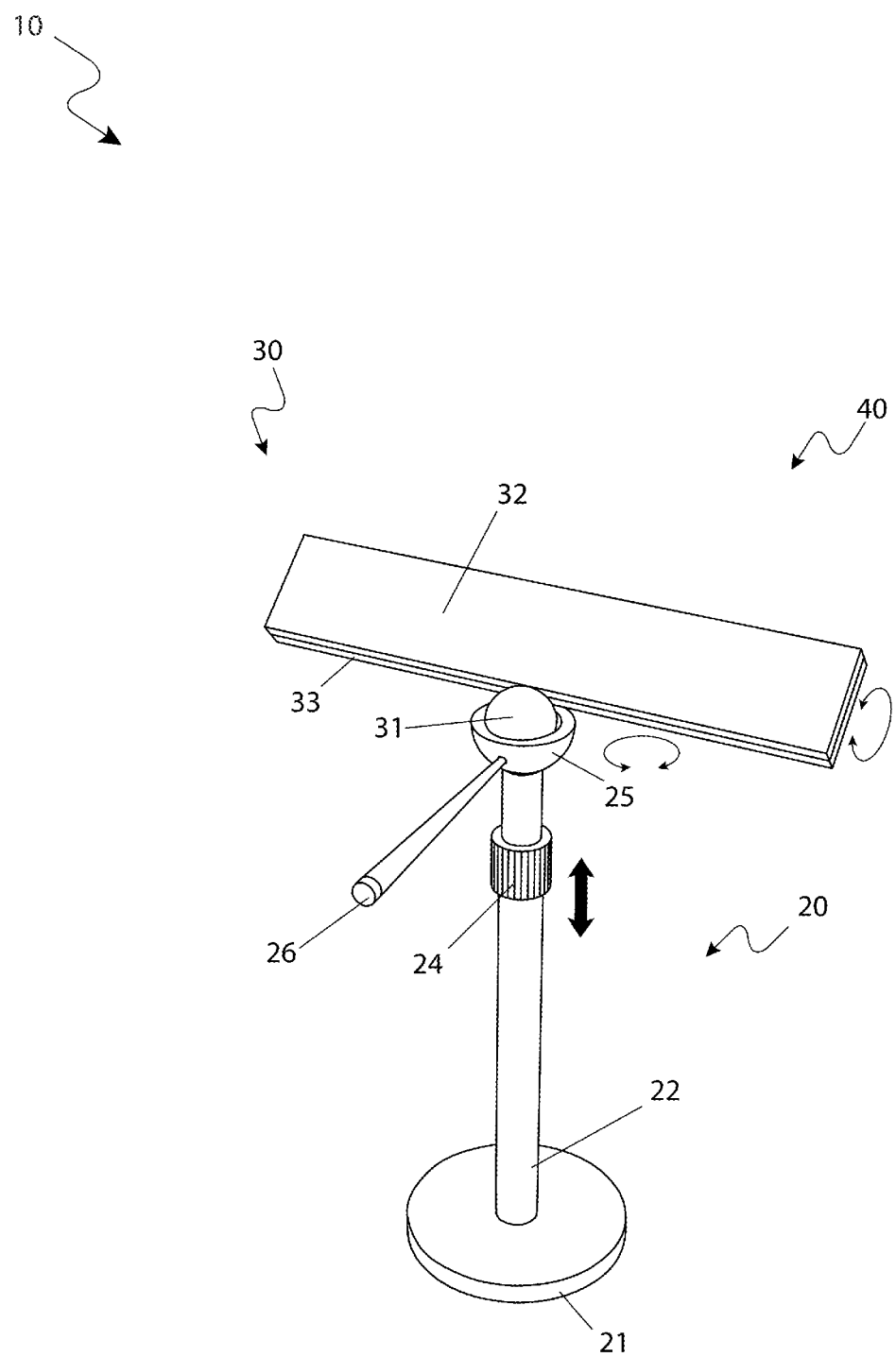
FIG. 2 is another perspective front view of the portable adjustable mirror stand 10 depicting a collapsed state, according to a preferred embodiment of the present invention.

Referring now to FIG. 1, a perspective view of the apparatus 10 and FIG. 2, another perspective view of the apparatus 10 depicting a collapsed state, according to the preferred embodiment of the present invention, are disclosed. The apparatus 10 comprises a lower portion 20 which further comprises a cylindrical base 21, an outer pole 22, and a collar 24. The base 21 provides support to the apparatus 10 when positioned on a level surface and the outer pole 22 provides a stationary extension to the apparatus 10. The outer pole 22 is preferably attached to the base 21 via conventional welding techniques, yet other attachment means may be utilized without limiting the scope of the apparatus 10. The outer pole 22 is approximately three (3) feet in length. An inner pole 23 is telescopically connected to the outer pole 22 such that the outer pole 22 comprises an appropriate diameter to slidably receive the inner pole 23. The outer pole 22 further comprises an open top end for insertingly receiving a lower end of the inner pole 23. The inner pole 23 slidably engages an inside diameter of the outer pole 22, thereby enabling the apparatus 10 to be adjusted to various desired heights. A collar 24 is disposed at the outer pole top end and encompasses both the outer pole 22 and the inner pole 23. The collar 24 is rotatable and manually tightened about the intersection of the outer pole 22 having a plurality of split portions 28 on an upper end thereof, and the inner pole 23, thereby providing a means to secure the inner pole 23 at a desired vertical position, much like a split shaft collar device similar to those used for tripods, awnings, or the like (see FIGS. 5 and 6).

Figure 3:
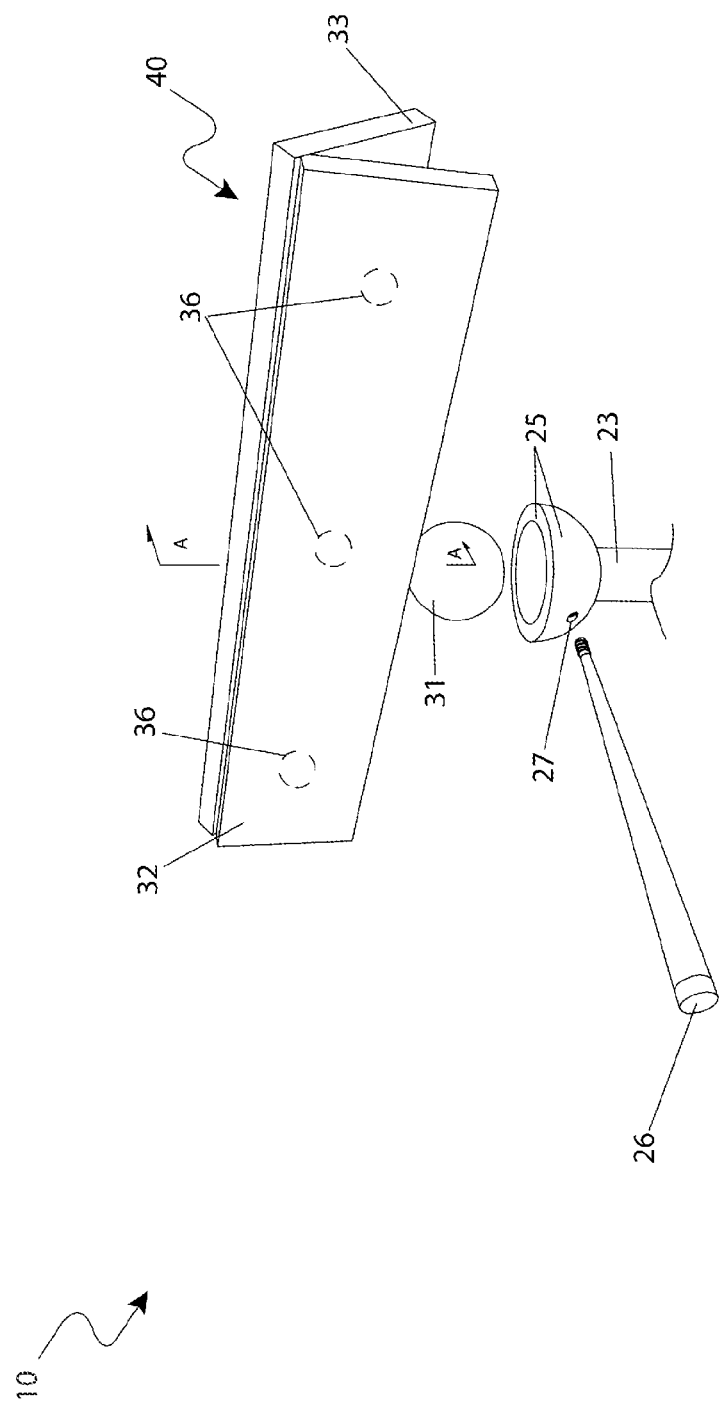
FIG. 3 is an exploded view of an upper portion 30 of the portable adjustable mirror stand 10, according to a preferred embodiment of the present invention.

The inner pole 23 is approximately three (3) feet in length and further comprises a socket 25 and a handle 26. An upper perimeter of the inner pole 23 comprises a socket 25 which allows a ball 31 to orbitally rotate therewithin. The ball 31 and socket 25 provide a pivoting interaction which allows selectable positioning an upper portion 30 at a desired angle. The socket 25 and the ball 31 combine to form a conventional ball and socket joint which grants unrestricted rotation in an indefinite number of axes, which have a single common center. The ball 31 is positioned inside of the socket 25 and is tightened at a desired position by a cylindrical handle 26 as shown in FIG. 3. The handle 26 threadably engages an aperture 27 such that a distal end of the handle 26 protrudes through the socket 25 and abuts against the ball 31. The handle distal end frictionally secures the ball 31 in the socket 25 at the desired angle as the handle 26 is turned, thus applying a force upon the ball. Although the pivotable nature of the upper portion 30 is depicted by use of a ball-and-socket joint, it can be appreciated that other methods of pivotably connecting the upper portion 30 to a top end of the inner pole 23 exist and may be utilized without limiting the scope of the present apparatus 10.

Figure 4:
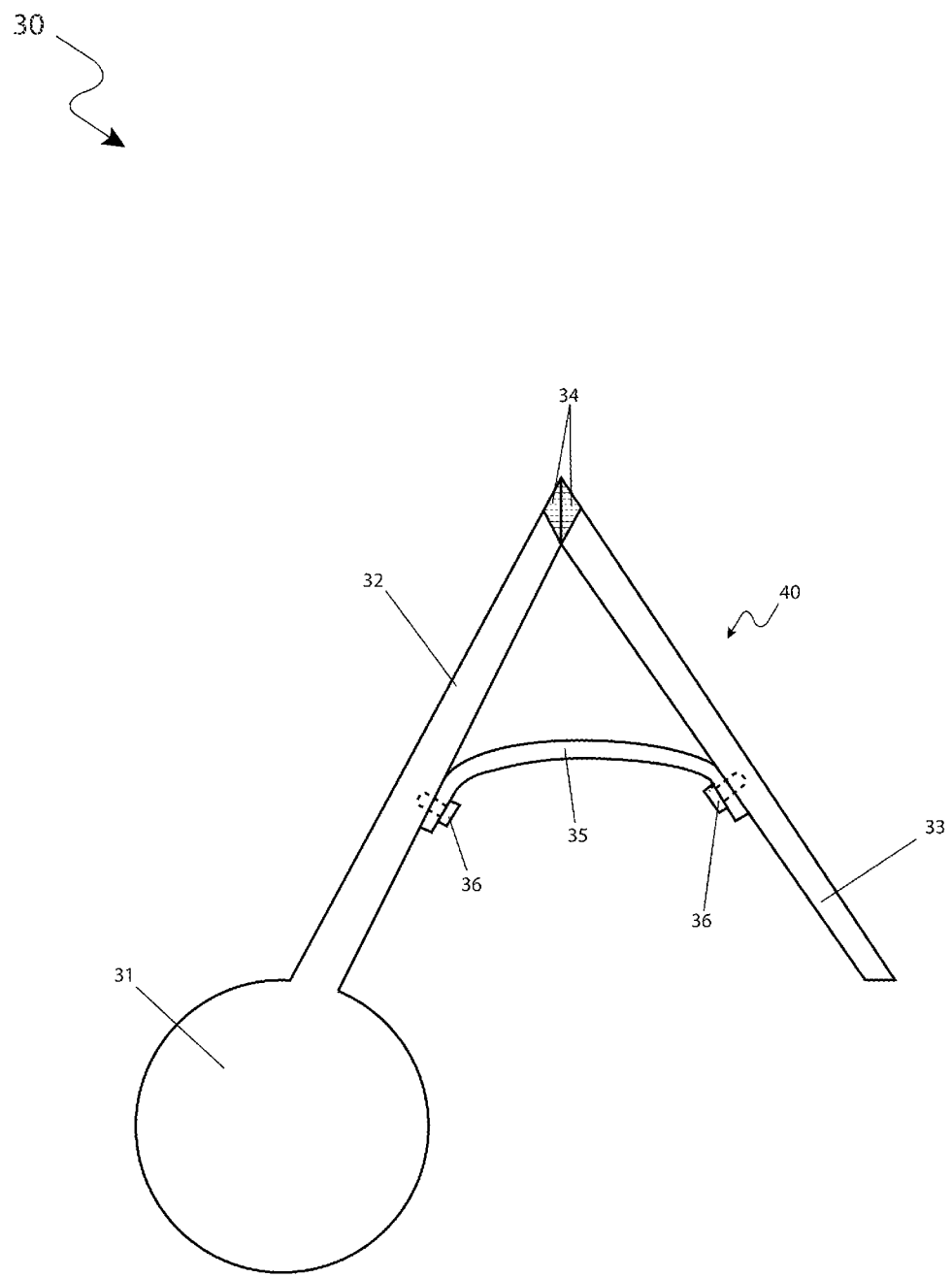
FIG. 4 is a section view of the upper portion 30 taken along line A-A of FIG. 3, according to a preferred embodiment of the present invention.

Referring now to FIG. 3, an exploded view of the upper portion 30 and FIG. 4, a section view of the upper portion 30 taken along line A-A of FIG. 3, according to the preferred embodiment of the present invention, are disclosed. The upper portion 30 comprises a spring clip 40 which provides for the insertion and the securing of the mirror 15 to the apparatus 10. The clip 40 further comprises a first jaw 32, a second jaw 33, a padded surface 34, and at least one length of spring steel 35. The first jaw 32 and the second jaw 33 are comprised of rectangular members angled inwardly towards each other, thereby providing a gripping means to a mirror 15. The jaws 32, 33 are fabricated from materials such as, but not limited to: metal, plastic, or the like.

Each jaw 32, 33 further comprising a jaw end and an actuator end opposite the jaw end. The jaw ends are urged closed by the length of spring steel 35 and are opened by squeezing the actuator ends toward one another. The jaws 32, 33 rotate about an axis defined by the length of spring steel 35. An intermediate portion of the first jaw actuator is integrally molded to a tangential surface of the ball 31 which provides a position of the first jaw 32 to accordingly match the position of the ball 31 and concurrently the position of the mirror 15. A top inner surface of the jaw end of each jaw 32, 33 further comprise a padded surface 34. The padded surface 34 provides protection from damage to the surface of the mirror 15. The padded surface 34 may comprise materials such as, but not limited to: foam rubber, felt, or the like.

The jaws 32, 33 are normally in a closed position and open and close by a plurality of lengths spring steel 35 longitudinally affixed to an inner surface of each jaw 32, 33. Each length of spring steel 35 comprises an arcuate form which deflects when the jaws 32, 33 are forced apart to an open position. While in the open position the mirror can be placed between the jaw ends of the jaws 32, 33. Each of the plurality of lengths of spring steel 35 is preferably attached to the inner surface of the jaws 32, 33 by a pair of opposing mechanical fasteners, such as rivets 36.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1 through 4.

The method of installing and utilizing the apparatus 10 may be achieved by performing the following steps: acquiring the apparatus 10; positioning the base 21 on a level surface; loosening the collar 24; adjusting the height of the apparatus 10 via slidably engaging the inner pole 23 to the outer pole 22 and tightening the collar 24 at the desired height; engaging a mirror 15 in an inverted orientation with the upper portion 30 via depressing the jaws 32, 33; resting the mirror 15 between the jaws 32, 33 and against the padding means 34; releasing the jaws 32, 33 to secure the mirror 15; adjusting the angle of the mirror 15, thereby rotating the ball 31 within the socket 25 and tightening to a desired angle via engaging the handle 26 with the aperture 27; utilizing the mirror 15 in a conventional manner; and, supporting the mirror 15 to assist in hair styling or the like in a manner which is quick, easy, and effective.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An adjustable stand for a handheld mirror, said stand comprising:
    a base for contact with a flat support surface;
    a telescopically connected pole assembly extending from a center of said base and terminating at a pivot connection, comprising:
        an elongated cylindrical outer pole having an affixed end affixed to said base center and an open end opposite said affixed end; and,
        an elongated cylindrical inner pole having an inserted end insertably attached to said open end opposite said pivot connection;
    wherein said outer pole further comprises a diameter suitably sized to slidingly receive said inner pole;
    at least one collar for adjustably securing said telescopically connected pole assembly at a desired vertical position;
    a spring clip attached to said pivot connection, said spring clip for removably retaining a handheld mirror;
    wherein said telescopically connected pole assembly extends or retracts with respect to said base;
    wherein said pivot connection comprises a ball and socket joint further comprising:
        a cup shaped socket affixed to said inner pole opposite said inserted end and a ball rotatably fit into said socket;
        a joint tightening device comprising an internally threaded aperture disposed in a side wall of said socket and a handle having a threaded shaft threadingly inserted within said aperture;
        wherein a distal end of said threaded shaft protrudes through said socket and abuts said ball when rotated to frictionally secure said ball at a desired rotational position.

2. The stand of claim 1, wherein said at least one collar is rotatable and manually tightened about an intersection of said outer pole and said inner pole, thereby providing a means to secure said inner pole at said desired vertical position.

3. The stand of claim 1, wherein said spring clip further comprises:
    an elongated first jaw comprising a first actuator end and a first jaw end opposite said first actuator end;
    an elongated second jaw comprising a second actuator end and a second jaw end opposite said second actuator end;
    wherein said first jaw and said second jaw are pivotable about a spring biased hinge; and,
    whereby said first jaw end and said second jaw end are urged closed by said hinge and are opened by squeezing said first actuator end and said second actuator end together.

4. An adjustable stand for a handheld mirror, said stand comprising:
    a circular base having a planar top and bottom side, a thickness, and a mass for contact with a flat support surface;
    an elongated cylindrical outer pole having an affixed end affixed to a center of said base and an open end opposite said affixed end;
    an elongated cylindrical inner pole having an inserted end telescopically connected to said open end;
    wherein said outer pole further comprises a diameter suitably sized to slidingly receive said inner pole and said inner pole extends or retracts with respect to said outer pole;
    a collar for adjustably securing said telescopically connected inner pole at a desired vertical position;
    a ball and socket joint comprising:
        a cup shaped socket affixed to said inner pole opposite said inserted end and a ball rotatably fit into said socket; and,
        a joint tightening device comprising an internally threaded aperture disposed in a side wall of said socket and a handle having a threaded shaft threadingly inserted within said aperture; and,
    a spring clip affixed to said ball for removably retaining a handheld mirror;
    wherein a distal end of said threaded shaft protrudes through said socket and abuts said ball when rotated to frictionally secure said ball at a desired rotational position.

5. The stand of claim 4, wherein said collar is rotatable and manually tightened about an intersection of said outer pole and said inner pole; thereby providing a means to secure said inner pole at said desired vertical position.

6. The stand of claim 5, wherein said spring clip further comprises:
- an elongated first jaw comprising a first actuator end and a first jaw end opposite said first actuator end; and,
- an elongated second jaw comprising a second actuator end and a second jaw end opposite said second actuator end;
- wherein said first jaw and said second jaw are pivotable about a spring biased hinge; and,
- whereby said first jaw end and said second jaw end are urged closed by said hinge and are opened by squeezing said first actuator end and said second actuator end together.

7. The stand of claim 6, wherein said spring biased hinge further comprises at least one length of arcuate spring steel affixed at an intermediate position on opposing inside surfaces of said first jaw and said second jaw.

8. The stand of claim 7, wherein an edge portion of said first actuator end is affixed to a tangential surface of said ball.

9. The stand of claim 8, wherein said first jaw end and said second jaw end each further comprises a padded surface affixed to an upper inside surface.

10. The stand of claim 9, wherein said outer pole further comprises a length of approximately three feet and said inner pole further comprises a length of approximately three feet.

11. The stand of claim 4, wherein said spring clip further comprises:
- an elongated first jaw comprising a first actuator end and a first jaw end opposite said first actuator end; and,
- an elongated second jaw comprising a second actuator end and a second jaw end opposite said second actuator end;
- wherein said first jaw and said second jaw are pivotable about a spring biased hinge; and,
- whereby said first jaw end and said second jaw end are urged closed by said hinge and are opened by squeezing said first actuator end and said second actuator end together.

12. The stand of claim 11, wherein said spring biased hinge further comprises at least one length of arcuate spring steel affixed at an intermediate position on opposing inside surfaces of said first jaw and said second jaw.

13. The stand of claim 11, wherein an edge portion of said first actuator end is affixed to a tangential surface of said ball.

14. The stand of claim 11, wherein said first jaw end and said second jaw end each further comprises a padded surface affixed to an upper inside surface.

\* \* \* \* \*